United States Patent [19]

Chatzopoulou et al.

[11] Patent Number: 5,543,325

[45] Date of Patent: Aug. 6, 1996

[54] TWO-STEP METHOD OF HYPO-OSMOTIC SHOCK FOR REDUCING VIABILITY OF BACTERIA

[75] Inventors: Athina Chatzopoulou, Athens, Greece; Roger J. Miles, Woking; Gerasimos Anagnostopoulos, Twickenham, both of United Kingdom

[73] Assignee: The Minister of Agriculture Fisheries and Food in her Britannic Majesty's Government of the United Kingdom of Great Britain and Northern Ireland, United Kingdom

[21] Appl. No.: 178,260

[22] PCT Filed: Jul. 10, 1992

[86] PCT No.: PCT/GB92/01257

§ 371 Date: Jun. 29, 1994

§ 102(e) Date: Jun. 29, 1994

[87] PCT Pub. No.: WO93/00822

PCT Pub. Date: Jan. 21, 1993

[30] Foreign Application Priority Data

Jul. 10, 1991 [GB] United Kingdom ............... 9114994

[51] Int. Cl.⁶ .............. A61K 38/43; C12P 1/00; C12N 1/06; C12N 1/20
[52] U.S. Cl. .............. 435/259; 424/94.1; 435/41; 435/252.1; 426/7; 426/262
[58] Field of Search ............... 424/94.1, 7, 262; 426/7, 262, 654; 435/41, 259, 252.1

[56] References Cited

PUBLICATIONS

Hughey et al., "Antimicrobial Act of Lysozyme . . . ", 1987, pp. 2165–2170.
Birdsell et al., "Prod. and Ultrastructure of Lysozyme . . . ", 1967, pp. 427–437.

*Primary Examiner*—David M. Naff
*Assistant Examiner*—Deborah K. Ware
*Attorney, Agent, or Firm*—Nixon & Vanderhye

[57] ABSTRACT

A method for reducing the viability of bacterial cells is disclosed. Further, a two-stage process of hypo-osmotic shock is used by exposing cells to a first solution having a water activity ($a_w$) of 0.997 or less. In addition after the first step the cells are further exposed to a solution of a higher $a_w$ that the first solution. The solutions are applied to the cells in the form of a spray or by immersion. The solutions are applied to the bacterial cells between 5 seconds and 30 minutes to obtain a reduction in the viability of the cells being treated of which are additionally treated with a solution of lysozyme contained in the solutions or to a cold shock treatment step. The cold shock treatment is applied by exposing the cells to a temperature in an aqueous liquid at 10° C. or less.

24 Claims, No Drawings

TWO-STEP METHOD OF HYPO-OSMOTIC SHOCK FOR REDUCING VIABILITY OF BACTERIA

BACKGROUND OF INVENTION

Recent reports on food-borne illness clearly indicate the economic and public health significance of salmonellosis and campylobacteriosis. In 1989, the number of confirmed salmonella cases in England and Wales rose to 29,998 (Cooke, M E. (1990). The Lancet 336:790–793.) while those of campylobacter rose to 32,359 (Skitrow M B.(a) (1990). Proceedings of the 14th International Symposium of the ICFMH. Telemark, Norway; (b) (1990). The Lancet 336: 921–23.) with estimated average tangible costs per case of £2,240 (Yule, B F et al (1988) Epidemiology and Infection 100: 35–42.) and £273 (Skitrow 1990 (a) (b)) respectively. Similar data exist for the U.S.A. where approximately 40,000 salmonella cases are reported annually, with average hospitalization or treatment costs rising up to $4,350 per case (Roberts T. (1988). Poultry Science 67: 936–43.). The incidence of campylobacter is also high and, for example, in the state of Washington, has been estimated at 100,000/150,000 (Todd, E. (1990). The Lancet 336: 788–90.). Confirmed cases of disease probably represent only 1 to 10% of the total number of clinically significant cases (Aserkoff B et al (1970). American Journal of Epidemiology 92: 13–24.; Oosterom (1990) Procedings of the 14th International Symposium of the ICFMH. Telemark, Norway.; Skirrow 1990a, b).

Following the compulsory heat treatment of milk in 1983 poultry meat has become the most incriminated food vehicle of salmonellosis and campylobacteriosis in the UK. The Public Health Laboratory Service ((1989) PHLS Microbiology Digest 6: 1–9) found that 60 to 80% of retail chickens in the UK were contaminated with salmonella while reports from other countries indicate levels ranging between 5 and 73%. The incidence of campylobacter may be even higher, and in some studies all chicken carcasses examined were contaminated (Hood, A M et al (1988) Epidemiology and Infection 100: 17–25.; Lammerding, A M et al (1988). Journal of Food Protection 51: 47–52.). In addition, contamination of red meats leads to sporadic cases of both salmonella and campylobacter disease. Thus there is considerable pressure on the meat and poultry industries to improve the bacteriological quality of their products by developing and applying decontamination processes.

Considerable effort has been devoted to the development of chemical decontamination techniques. However, although a large number of chemical treatments have been tested (Table 1), these have in general proven either unsuccessful on application, or have had adverse effects on the appearance, odour or taste of meat, occasionally leaving undesirable residues. Chlorine is the only chemical currently in use in poultry processing operations and maximum levels of 20 ppm in the spray wash are recommended by the EC, although higher concentrations (40 ppm) may be required to reduce bacterial populations in both carcasses and equipment. Chlorine, however, can damage processing equipment and leads to the formation of potential carcinogens such as chlorinated hydrocarbons when contacted with organic matter.

There has been for many years a considerable interest in using the enzyme lysozyme as a food preservative. Lysozyme is a naturally occurring antimicrobial agent, has no adverse effects on man and is present, for example, in tears and milk. It can also easily be recovered through industrial processes from egg-white and is approved for food use in Europe, Japan and the U.S.A. (Hughey, V L et al (1987). Applied and Environmental Microbiology 53: 2165–2170). Table 2 lists the variety of food products that may be preserved by treatments involving lysozyme derived from milk or egg-white.

Lysozyme may cause rapid lysis of Gram-positive bacteria but unless subjected to modifying treatments, cells of Gram-negative bacteria are resistant. Lysozyme hydrolyses peptidoglycan, a polymer present in the cell walls of Gram-positive and Gram-negative bacteria which maintains rigidity of the wall. In Gram-positive organisms, peptidoglycan is present throughout the cell wall, which consists of a more or less homogeneous matrix of peptidoglycan and other polymers.

However, in Gram-negative bacteria, peptidoglycan exists as a discrete layer which is protected from the environment by a lipid outer membrane which acts as a permeability barrier against large molecules, such as lysozyme (MW 14,900 D). Thus, in the absence of procedures for modifying the outer membrane, only foods dominated by a Gram-positive bacterial flora may be preserved by lysozyme.

The outer membrane of Gram-negative bacteria may be disrupted by heat (Becker M E et al (1954) Archives of Biochemistry and Biophysics 53: 402–410; freezing and thawing (Kohn, N R. (1960) Journal of Bacteriology 79: 697–706.); extraction of the lipopolysaccharide component of the outer membrane with lipid solvents or alkali (Becker et al (1955) Archives of Biochemistry and Biophysics 55: 257–269.), starvation at extreme pH environments (Nakamura, O. (1923) Immunitatsforschrift 38: 425–449; Grula, E A et al (1957) Canadian Journal of Microbiology 3: 13–21), treatments with EDTA (Repaske, R. (1956) Biochemica et Biophysica Acta 22: 189–191 and (1958) Biochemica et Biophysica Acta 30: 225–232), detergents (Colobert L. (1957) Comptes Rendues 245: 1674–1676.), or polybasic antibiotics (Warren G H (1957) Journal of Bacteriology 74: 788–793.). Hypo-osmotic shock in the presence of lysozyme (Birdsell, D C et al 1967. Journal of Bacteriology 93: 427–437; Witholt, B H et al (1976) Biochimica et Biophysica Acta 443: 534–44.) has also been demonstrated to kill *Escherichia coli* (*E. coli*) cells suspended in Tris-EDTA buffer and plasmolysed by the addition of sucrose.

Procedures involving EDTA and lysozyme have been tested on shrimp (Chandler R et al (1980) Applied Microbiology and Biotechnology 10: 253–258.) and poultry (see Table 2), but although some reduction in contamination levels was observed the use of EDTA makes the technique generally inapplicable to food-treatment. Osmotic shock procedures (Withholt B H et al 1976) might also be acceptable in food processing if the requirement for EDTA could be eliminated.

The transfer of bacteria from typical growth media ($a_w$ 0.999) to media made hypertonic by the addition of solutes which do not penetrate cells, such as sucrose or NaCl, is accompanied by an abrupt loss of cell water. Gram-negative bacteria subjected to such hyper-osmotic shock undergo "plasmolysis" which is characterised by loss of turgor pressure, shrinkage of the protoplast (Witter L (1987) Vol. 1: 1–35. In T J Montville (ed), Food Microbiology. CRC Press, Florida.), retraction of the cytoplasmic membrane from the outer membrane (Scheie, P O. (1969) Journal of Bacteriology 98: 335–40.), or contraction of the whole cell (Alemohammad M M et al (1974) Journal of General Microbiology 82: 125–142.). Subsequent survival, growth rate and maximum population density then depends upon the $a_w$ of the medium and the rate and extent to which the osmoregulatory mechanisms (Booth, I R, et al (1988) Journal of Applied Bacteriology Symposium Supplement PP. 35–49; Csonka L N. (1989) Microbiological Reviews 53: 121–147) of the organism may be restored to regain cell water (Dhavises, G et al (1979) Microbios Letters 7: 105–115. and (1979) Microbios Letters 7: 149–59.).

Water uptake is achieved by 'deplasmolysis', which in contrast to plasmolysis requires the presence of an energy source in the medium and is characterised by uptake and accumulation of K+ ions and uptake and/or synthesis of certain organic osmolytes, referred to as compatible solutes or osmoprotectants.

In contrast, transfer of cells from media of low to high $a_w$ (water activity), thus effecting hypo-osmotic shock, results in an instantaneous influx of water and a concomitant increase in the cytoplasmic volume. However, cell volume increase in bacteria is generally limited by the presence of the cell wall which is relatively rigid and may withstand pressures of up to 100 atmospheres.

Although hypo-osmotic shock does not generally result in cell lysis, it may cause membrane disruption which can be demonstrated by the loss of intracellular solutes, such as ions, neutral and anionic sugars and phosphate esters (Leder, I G (1972) Journal of Bacteriology 111: 11–19; Tsapis A et al (1976) Biochimica et Biophysica Acta 469: 1–12.). Such loss has been described at optimum growth temperatures (30°–37° C.) and at 45° C., as well as in combination with cold shock.

Cold shocks are achieved by rapidly lowering the temperature of cell suspensions, for example from 37° C. to 0° C. (Sherman, J M et al (1923) Journal of Bacteriology 8: 127–139.). The shock may result in cell death and cells from the exponential phase of growth are most susceptible (Jay, J. (1986) Modern Food Microbiology. 3rd ed Van Nostrand Reinhold Co Inc, NY.). Lysozyme has been reported to enhance lysis of exponential phase $E.$ $coli$ cells suspended in Tris-HCl buffer and subjected to cold shock (Scheie, P O. (1982) Biochimica et Biophysica Acta 716: 420–23.), though Tris-HCl may itself aid lysis of Gram-negative cells (Schindler, H et al (1979) American Chemical Society 18: 4425–30.).

SUMMARY OF INVENTION

The present inventors have developed novel techniques which rapidly kill both Gram-negative and Gram-positive bacteria, being particularly useful in the destruction of those bacteria of significance in the food industry such as Salmonella typhimurium, E. coli and the common meat spoilage organism, Pseudomonas fluorescens. The techniques are based on combined treatments involving hypo-osmotic shocks combined with exposure to lysozyme and/or cold shock. Such procedures appear suitable for the treatment of animal carcasses, since no addition of toxic chemicals (eg EDTA) is required. Application of these procedures to meat treatment may, therefore, lead to reduced levels of pathogens and improve keeping qualities. Both immersion and spray techniques may be used to apply the treatment media.

The advantages of the treatment are several-fold:
(i) It is non-toxic, making use of lysozyme, a naturally occurring anti-microbial enzyme, already approved for food use in both Europe and U.S.A. Low concentrations of egg-white may also be used as an effective substitute for purified enzyme preparations.
(ii) It is economically viable, using only low cost materials (NaCl, sucrose, egg-white).
(iii) It does not necessitate major alterations in current processing-plant technology, as the washing procedures required may be carried out using existing washing tanks and sprayers.
(iv) It does not cause corrosion as a consequence of pH change, or scaling of metal equipment.
(v) No additional effluents of environmental consequence are produced and cross-contamination of carcasses is potentially reduced due to lower numbers of organisms being found in wash solutions.
(vi) It is potentially effective against all Gram-negative organisms; of particular interest in this group are salmonellae and campylobacters.
(vii) It is suitable for processing plants, catering establishments and possibly households.
(viii) It is relatively simple and may be carried out using unskilled labour.

Thus the present invention provides a method for the destruction of bacterial cells of beth Gram-negative and Gram-positive classes comprising subjecting said cells to hypo-osmotic shock in combination with a further treatment selected from the group comprising (a) exposure of the cells to lysozyme and (b) subjecting the cells to cold-shock.

DESCRIPTION OF PREFERRED EMBODIMENTS

Preferably the hypo-osmotic shock is applied by exposure of the cells to a first solution having a water activity ($a_w$) of 0.997 or less and then exposing them to a solution of $a_w$ higher than that of said first solution. More preferably the first solution has a water activity ($a_w$) of 0.992 to 0.96 and most preferably of 0.974 to 0.96. It is particularly convenient that the solution of higher water activity contains the lysozyme for the further treatment (a).

The solution having water activity of 0.997 or less is preferably applied for between 5 seconds and 30 minutes, more preferably for between 30 seconds and 20 minutes and most preferably is applied for between 1 and 5 minutes.

In this first aspect of the present invention providing a method for the destruction of bacterial cells of both Gram-negative and Gram-positive classes comprising subjecting the cells to hypo-osmotic shock combined with exposure to lysozyme, it is preferred that the cells are first exposed to a nutrient containing medium. Particularly preferred is a method wherein the solution of water activity of 0.997 or less is a nutrient containing medium.

The present inventors have found that when stationary phase Gram -negative cells are suspended in a media (eg. a foodstuff compatible media such as sucrose or NaCl) of low $a_w$ they undergo a rapid dehydration (plasmolysis) followed by a relatively slow rehydration (deplasmolysis) which is dependent upon the $a_w$ and nutrient composition of the medium in which the cells were suspended, temperature, and the presence of osmoprotectants (eg proline, betaine). When the partly or fully deplasmolysed cells are transferred to deionised water containing lysozyme, high kill rates are observed.

Kill rates of the order of 90% can be achieved using media lacking in nutrients and it is thought that this is enabled by deplasmolysis using the organisms internal energy reserves.

Best results however are obtained where optimal growth conditions are provided in the application of the first treatment. Thus any nutrient capable of supporting deplasmolysis of the target organism may be employed to achieve enhanced bactericidal effect of the present method; examples of these being given in the Tables and Examples provided herein. Simple media such as glucose or lactalbumin hydrolysate (casein hydrolysate—hydrolysed milk protein) at eg. about 5 g l$^{-1}$ can be successfully used. Ideally the first treatment is applied at a temperature optimised for deplasmolysis to take place in the target organism. Thus for Salmonella or Shigella media at about 37° C. optimally are used while for Pseudomonas about 30° C. is preferred. Using these optimised media and temperatures kill rates in excess of 99.99% may be achieved (see Table 3).

The lysozyme may conveniently be provided as commercially available lysozyme (eg. 10 µg ml$^{-1}$ or more) or lysozyme in the form of pasteurised (eg. at 63° C., 4 min) freeze-dried egg-white (eg 0.5 mg ml$^{-1}$ or more), prepared in the laboratory Preferably the lysozyme is provided at a concentration of 5 µg ml$^{-1}$ or more and more preferably is in the solution of higher $a_w$. More preferably the lysozyme is provided at a concentration of 10 µg ml$^{-1}$ or more, most preferably at a concentration of 50 µg ml$^{-1}$ or more. Conveniently the lysozyme is in the form of a solution of pasteurised freeze-dried egg-white wherein the concentration of the egg-white in the solution is 0.1 mg ml$^{-1}$ or more, more preferably 0.5 mg ml$^{-1}$ or more.

In a second aspect of the present invention there is provided a method for the destruction of bacterial cells of both Gram-negative and Gram-positive classes by subjecting the cells to a combination of cold shock and hypo-osmotic shock. The treatment may be applied in the presence or absence of lysozyme, but preferably with lysozyme.

The present inventors have found that when stationary phase Gram-negative cells are suspended at low temperature (eg. 0° to 10° C.) in deionised water containing solute (eg. NaCl at 0.2 to 0.8 mol/l) but no nutrients deplasmolysis does not take place. If, after temperature equilibration, cells are transferred to deionised water (at the same temperature with or without lysozyme cell destruction occurs.

This further treatment comprises exposure to cold shock wherein said shock comprises exposure to a temperature of 10° C. or below, more preferably comprising exposure to an aqueous liquid at 10° C. or below. Particularly preferred are treatments where this aqueous liquid is at 8° C. or below, most preferably 0° C. or below.

Preferably the exposure is for a period sufficient to equilibrate the temperature of the cells to that of the exposure temperature, preferably being for about 10 minutes. Preferably the temperature of the bacteria prior to shock is at from 15° C. to 37° C.

Maximum cell destruction (100%) has been observed by following a 30 min incubation in NaCl medium at 0° C. with deionised water/lysozyme treatment. Such deionised water/lysozyme treatment is as described for the lysozyme treatment in the first aspect of this invention but is carried out using a cold shock inducing solution. The extent of cell destruction for $E.$ $coli$ and $S.$ $typhimurium$ at 8° and 0° C. was investigated and results are shown in Table 4 below.

By way of comparison, the ability of lysozyme to kill cells during cold shock (eg. on sudden transfer from between deplasmolysis enabling temperatures (eg. 15° C.–37° C.) to 10° C.–0° C.) in deionised water with or without NaCl was confirmed, however, maximum cell destruction was less than 80% without the hypo-osmotic treatment.

The method of the present invention will now be illustrated further with regard to the following non-limiting examples which are provided for the purpose of assisting a man skilled in the art to determine suitable conditions for given situations. Other embodiments falling within the scope of the present invention will occur to the man skilled in the art in the light of these examples.

The in vitro methods described above were adapted for the decontamination of artificially contaminated red meat and poultry skin but can equally be used on any meat and may be particularly applied to treatment of fish meats such as eg. prawns and shrimps.

EXAMPLE 1

Meat/poultry skins were dipped in aqueous sucrose or NaCl medium ($a_w$ 0.979) for 10 min at 20°–37° C. and then washed in an aqueous solution of pasteurised egg white or pure lysozyme.

EXAMPLE 2

Meat/poultry skins were dipped in an aqueous solution of NaCl (0.8M; $a_w$ 0.974) for up to 30 min at 0° C. and then sprayed with or dipped in an aqueous solution of pasteurised egg white or pure lysozyme for up to 30 min at 0° C.

Results

The (%) recovery of $S.$ $typhimurium$ cells from artificially contaminated meat/chicken skin treated according to the above procedures of Examples 1 and 2 is given in Tables 5 and 6 respectively. The number of organisms recovered ie. still attached to the sample of meat or skin, was less than 10% of the population initially applied. Also, the number of organisms recovered in the washing solutions was reduced by low temperature NaCl/lysozyme treatment (Table 7 a–b). This may of significance in poultry processing where it is believed that cross-contamination of carcasses may occur via washing solutions.

Bacterial contamination for laboratory tests was simulated by immersion of fresh chicken pieces in Brain Heart Infusion Broth containing 5×10$^9$ cell/ml of the organism to be destroyed. The pieces were removed from the broth and air dried prior to use. When the treatment is applied to the surfaces of artificially contaminated meat a reduction in numbers of Gram Negative Bacteria of over 90% is achieved. The efficacy of the procedure at both higher and low temperatures allows for the application of the treatment at a number of sites within a typical meat processing factory.

It will be appreciated that certain applications will require particular techniques for improving the contact of the shock and lysozyme media with the surfaces upon which the bacteria are located. Such surfaces may for example be animal skin upon which there are located many pores in which the bacteria might be located. Any technique which will allow improved access of the media might be used as long as it is acceptable for food product use. Thus electrostatic spray techniques, where a charge is applied to the media prior to application, or the inclusion of acceptable surfactant in said media might be used. Acceptable surfactants would include those emulsifiers or detergents that are suitable for food processing, eg. the emulsifier lysolecithin.

TABLE 1

Chemicals evaluated for the decontamination of fresh meat and poultry.

| Compound | Reference |
|---|---|
| Ammonia | Smol'skii et al 1985 |
| Acetic acid | Goepfert & Hicks 1969; Eustace 1981 |
| Chlorine | Sanders & Blackshear 1971; Marshal et al 1977 |
| Chloroacetamide, Iodoacetamide | Islam et al 1978 |
| Glutaraldehyde | Thomson et al 1977 |
| Hydrogen peroxide | Lillard & Thomson 1983; O'Brien 1987 |
| Lysozyme and EDTA | Samuelson et al 1985; Teotia & Miller 1975 |
| Ozone | Sheldon & Braun 1986 |
| Polyformate acid | Parker 1987, 1988 |
| Poly(hexamethylene-biquanide hydrochloride) | Thomson et al 1981 |
| Potassium sorbate | Morrison & Fleet 1985 |
| Sodium chloride | Morrison & Fleet 1985; Foster 1987 |
| Sodium and Potassium hydroxide | Dickson 1988 |
| Sorbic acid | Perry et al 1984 |
| Succinic acid | Juven et al 1974 |

TABLE 2

Food preservation using lysozyme

| Food | Specifically Targeted Organisms | Reference |
|---|---|---|
| Fresh vegetables, fruit and fish meat | | Kanebo Ltd 1973 |
| Seafood | | Eisai Co 1971; 1972; Decadt & Debevere 1990 |
| Sushi, noodles pickles, cream custard | | Yashitake & Shnichirio 1977 |
| Kamaboko | | Akashi & Oono 1968 |
| Vienna-type sausage | | Akashi 1970 |
| Salami sausage | | Akashi 1971 |
| Sake | Lactobacilli | Yajima et al 1968 |
| Infant food | | Nishihava & Isoda 1967; Moriguna Milk Industry Co 1970 |
| Cheese | Clostridia | Wasserfall & Teuber 1979; Ferrari & Dell'Agua 1979 |

TABLE 3

Optimum conditions for maximum destruction of stationary phase *E. Coli* B/r/1 cells incubated in chemically defined or nutrient rich media of reduced $a_w$ and subsequently diluted in deionised water containing lysozyme.

| Reduced $a_w$ medium | $a_w$ | Incub. time (min) in low $a_w$ medium | Lysozyme conc. in deionised water | % kill |
|---|---|---|---|---|
| Sucrose-DMA(a) | 0.986 | 1 | 10 μg ml$^{-1}$ | >99 |
| | 0.981 | 1 | | >99 |
| Sucrose-BHI(b) | 0.986 | 1 | 10 μg ml$^{-1}$ | >99 |
| | 0.981 | 1 | | >99 |
| NaCl(*)—DMA | 0.992 | 10 | 50 μg ml$^{-1}$ | >99 |
| | 0.986 | 20 | | >99 |
| | 0.980 | 1 up to 30 | | 70 |
| NaCl—BHI | 0.986 | 1 | 50 μg ml$^{-1}$ | >99 |
| | 0.980 | 1 | | >99 |
| | 0.972 | 1 | | >99 |

Key: (a) Defined Medium A (as per Poole et al (1974), Biochemical Journal 144: 77–85: (b) Brain Heart Infusion broth (as commercially available) (*) NaCl = Sodium chloride In all cases the amount of NaCl or sucrose is varied to achieve the desired $a_w$, the nutrient medium composition remaining constant in all other respects. All treatments were carried out using solutions at between 20° and 37° C.

TABLE 4

The effect of lysozyme on *E. coli* and *S. typhimurium* cells subjected to hypo-osmotic shock at 0 or 8° C.

| Cells(a) | Temperature of NaCl solution | presence of lysozyme | % Kill |
|---|---|---|---|
| *E. coli* | 0 | − | 94 |
| | | + | 96 |
| | 8 | − | 92 |
| | | + | 94 |
| *S. typhimurium* | 0 | − | 99 |
| | | + | 99 |
| | 8 | − | 88 |
| | | + | 99 |

Key: (a) - Cells were incubated in NaCl (0.8 M; $a_w$ 0.974) for 10 min and subsequently transferred to and incubated for 30 min in deionised water in the presence (10 μg ml), or absence of lysozyme.

TABLE 5

Decontamination of meat at ambient temperature using hypo-osmotic wash and a further wash in the presence or absence of lysozyme.

| Washing procedure | | Salmonella recovered | |
|---|---|---|---|
| 1st wash | 2nd wash | c.f.u. g$^{-1}$(*) | % of total bacteria |
| NaCl—BHI (0.8 M) | water (− lysozyme) | 2.22 × 10$^5$ | 9.91 |
| NaCl—BHI (0.8 M) | water (+ lysozyme) | 8.53 × 10$^4$ | 3.80 |

Key: (*) - Meat was contaminated with *S. typhimurium* (2.24 × 10$^6$ colony forming units (c.f.u.) g$^{-1}$, and subjected to a washing procedure at 23° C. The first wash was of NaCl—BHI medium and the second was of water, with or without lysozyme.

TABLE 6

Decontamination of poultry skin at low temperature in the presence or absence of lysozyme.

| Washing procedure | | Salmonella recovered | |
|---|---|---|---|
| 1st wash | 2nd wash | c.f.u. g$^{-1}$(*) | % of total applied bacteria |
| water Control | water (− lysozyme) | 1.03 × 10$^7$ | 10.20 |
| NaCl | water (− lysozyme) | 1.11 × 10$^6$ | 1.10 |
| NaCl | water | 9.69 × 10$^5$ | 0.96 |

TABLE 6-continued

Decontamination of poultry skin at low temperature in the presence or absence of lysozyme.

| Washing procedure | | Salmonella recovered | |
|---|---|---|---|
| 1st wash | 2nd wash | c.f.u. $g^{-1}$(*) | % of total applied bacteria |
| | (+ lysozyme) | | |

Key: (*) - Skin was contaminated with *S. typhimurium* ($1.01 \times 10^8$ c.f.u $g^{-1}$) and subjected to a washing procedure at 0° C. The first wash was of water or NaCl (0.8 M), and the second wash was of water, with or without lysozyme.

TABLE 7a

Organisms recovered in the first washing solution.

| Wash | c.f.u. $g^{-1}$ | % of total bacteria |
|---|---|---|
| Water (Control) | $7.02 \times 10^7$ | 69.6 |
| NaCl | $9.19 \times 10^6$ | 9.1 |

TABLE 7b

Organisms recovered in the second washing solution.

| Wash | c.f.u. $g^{-1}$ | % of total bacteria |
|---|---|---|
| Water (Control; − lysozyme) | $2.04 \times 10^7$ | 20.20 |
| Water (− lysozyme) | $1.01 \times 10^6$ | 1.00 |
| Water (+ lysozyme) | $4.54 \times 10^5$ | 0.40 |

TABLE 8

References for Tables 1 and 2:

Akashi, A. (1970) Japanese Journal of Zootechnology and Science 40: 243.
Akashi, A. (1971) Japanese Journal of Zootechnology and Science 42: 243.
Akashi, A et al (1972) Journal of Agricultural Chemistry Society of Japan 46: 177.
Decadt, Y et al (1990) Voedingsmiddelentechnologie 23: 18–21.
Dickson, J S (1988) Journal of Food Protection 51: 869–873.
Eisai Company (1971) Japanese Patent 19576/71.
Eisai Company (1972) Japanese Patent 5710/72.
Eustace I J (1981) Food Technology in Australia 33: 28.
Ferrari L et al (1979) UK Patent Application 2014032A.
Goepfert J M et al (1969) Journal of Bacteriology 97: 956.
Islam M N et al (1978) Poultry Science 57: 1266–1271.
Juven B J et al (1974) Journal of Milk and Food Technology 37: 237–239.
Kanebo Ltd (1973) Japanese Patent 4831-905.
Lillard H S et al (1983) Journal of Food Science 48: 125-126.
Marshall R J et al (1977) Journal of Food Protection 40: 246
Morinaga Milk Industry Co. (1970) Japanese Patent 16-780/70.
Morrisson G J et al (1985) Journal of Food Protection 48: 937–943.
Nishihava K et al (1967) Acta paediatrica Japonica 71: 95.
O'Brien G T (1987) U.S. Pat. No. 4 683 618.
Parker D A (1987) BP Chemicals Ltd. U.S. Pat. No. 4 766 646.
Parker D A (1988) BP Chemicals Ltd. EP 0247 803 A2
Perry G A (1984) Food Technclogy 18: 891–97.
Samuelson K J et al (1985) Poultry Science 64: 1488–90.
Sheldon B W et al (1986) Journal of Food Science 51: 305–309.
Smol'skii N T (1985) SU 1173 970 A
Teotia J J (1975) Poultry Science 54: 1284 88.
Thomson J E et al (1977) Journal of Food Science 42: 1353–55.
Thomson J E et al (1981) Journal of Food Protection 44: 440–41.
Wasserfall F et al (1979) Applied and Environmental Microbiology 38: 197–99.

TABLE 8-continued

References for Tables 1 and 2:

Yajima (1968) Journal of Fermentation Technology 46: 782–88.
Yashitake S et al (1977). New Food Inc. 19: 17

We claim:

1. A method for reducing the viability of bacterial cells comprising subjecting said cells to hypo-osmotic shock by (1) exposing said cells to a first solution having a water activity ($a_w$) of 0.997 or less and thereafter (2) exposing the cells to a solution having a higher $a_w$ than that of said first solution.

2. The method as claimed in claim 1 wherein the hypo-osmotic shock is applied by treating said cells with a first solution having a water activity of 0.992 to 0.96 and then treating said cells with a solution having a higher $a_w$ than said first solution.

3. The method as in claim 1 wherein the hypo-osmotic shock is applied by treating said cells with a first solution having water activity of 0.974 to 0.96 and then treating said cells with a solution having a higher $a_w$ than said first solution.

4. The method as claimed in any one of claims 1, 2 or 3 wherein the solution having water activity of 0.997 or less is applied for between 5 seconds and 30 minutes.

5. The method as claimed in claim 4 wherein the solution having the water activity of 0.997 or less is applied for between 30 seconds and 20 minutes.

6. The method as claimed in claim 5 wherein the solution having the water activity of 0.997 or less is applied for between 1 and 5 minutes.

7. The method as claimed in claim 6 wherein the solution having the water activity of 0.997 or less is a nutrient containing medium.

8. The method as claimed in any one of claims 1, 2 or 3 wherein said bacterial cells are additionally treated with a solution of lysozyme.

9. The method as claimed in claim 8 wherein the lysozyme is present in said solution at a concentration of at least 5 μg $ml^{-1}$.

10. The method as claimed in claim 8 wherein the lysozyme concentration is at least 10 μg $ml^{-1}$.

11. The method as claimed in claim 8 wherein the lysozyme concentration is at least 50 μg $ml^{-1}$.

12. The method as claimed in claim 8 wherein said lysozyme solution also contains pasteurized freeze-dried egg-white.

13. The method as claimed in claim 12 wherein the concentration of egg-white is at least 0.1 mg $ml^{-1}$.

14. The method as claimed in claim 13 wherein the concentration of egg-white is at least 0.5 mg $ml^{-1}$.

15. The method as claimed in claim 1 wherein the solution of higher water activity in step (2) contains lysozyme.

16. The method as claimed in claim 1 wherein the bacterial cells are additionally treated to cold shock by exposing the bacterial cells to a temperature of at most 10° C.

17. The method as claimed in claim 16 wherein the cells are exposed to an aqueous liquid at 10° C. or lower.

18. The method as claimed in claim 16 wherein the cold shock temperature at most is 8° C.

19. The method as claimed in claim 17 wherein the cold shock temperature of said liquid is at least 0° C.

20. The method as claimed in claim 16 wherein the exposure to the cold shock is for a time period sufficient to equilibrate the temperature of the cells to that of the cold shock temperature.

21. The method as claimed in claim 20 wherein the exposure to the cold shock temperature is for about 10 minutes.

22. The method as claimed in claim 16 wherein the temperature of the bacterial cells prior to said cold shock is 15° C. to 37° C.

23. The method as claimed in claim 1 wherein one or both of the solutions is applied in the form of a spray.

24. The method as claimed in claim 1 wherein one or both of the solutions is applied by immersion of the bacterial cells therein.

* * * * *